Oct. 17, 1933.  R. L. NEWTON  1,930,823
VEHICLE PROPELLING MECHANISM
Filed July 29, 1932  2 Sheets-Sheet 1
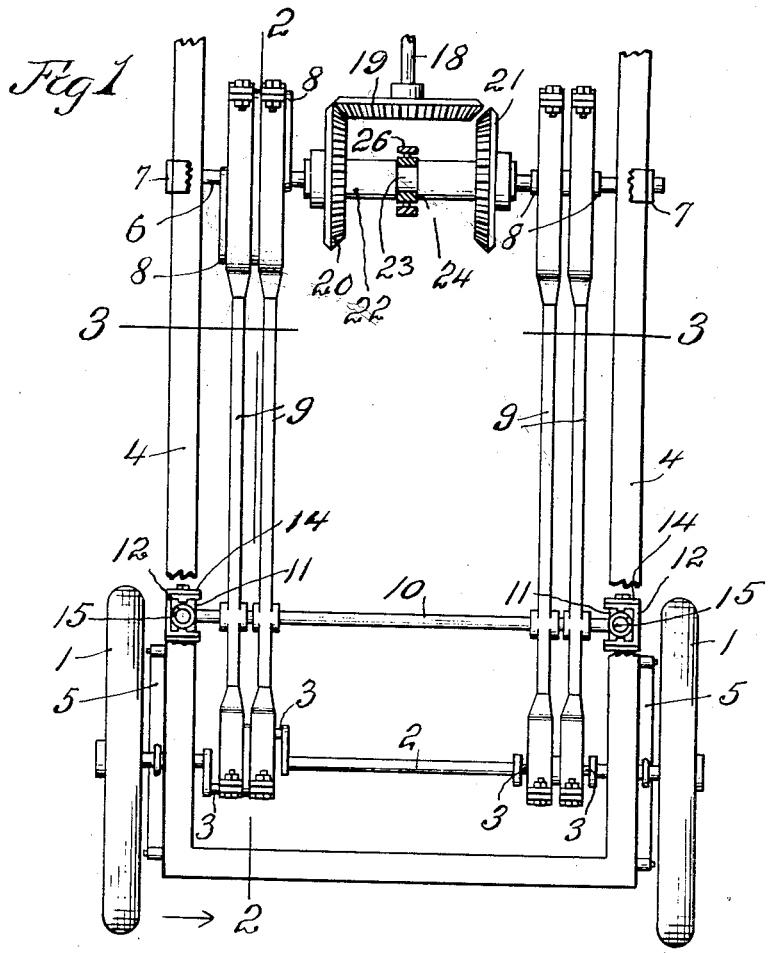
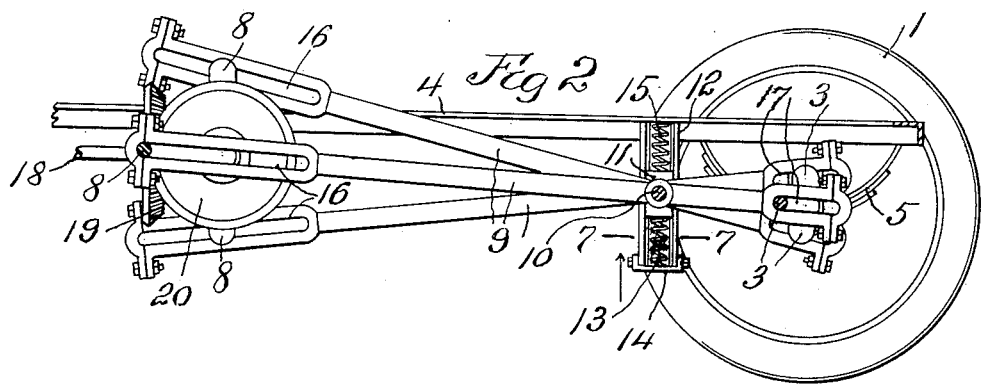
Witness
H. Vernon Olson
INVENTOR
Ralph L. Newton
BY Warren D. House
His ATTORNEY Oct. 17, 1933. R. L. NEWTON 1,930,823
VEHICLE PROPELLING MECHANISM
Filed July 29, 1932 2 Sheets-Sheet 2
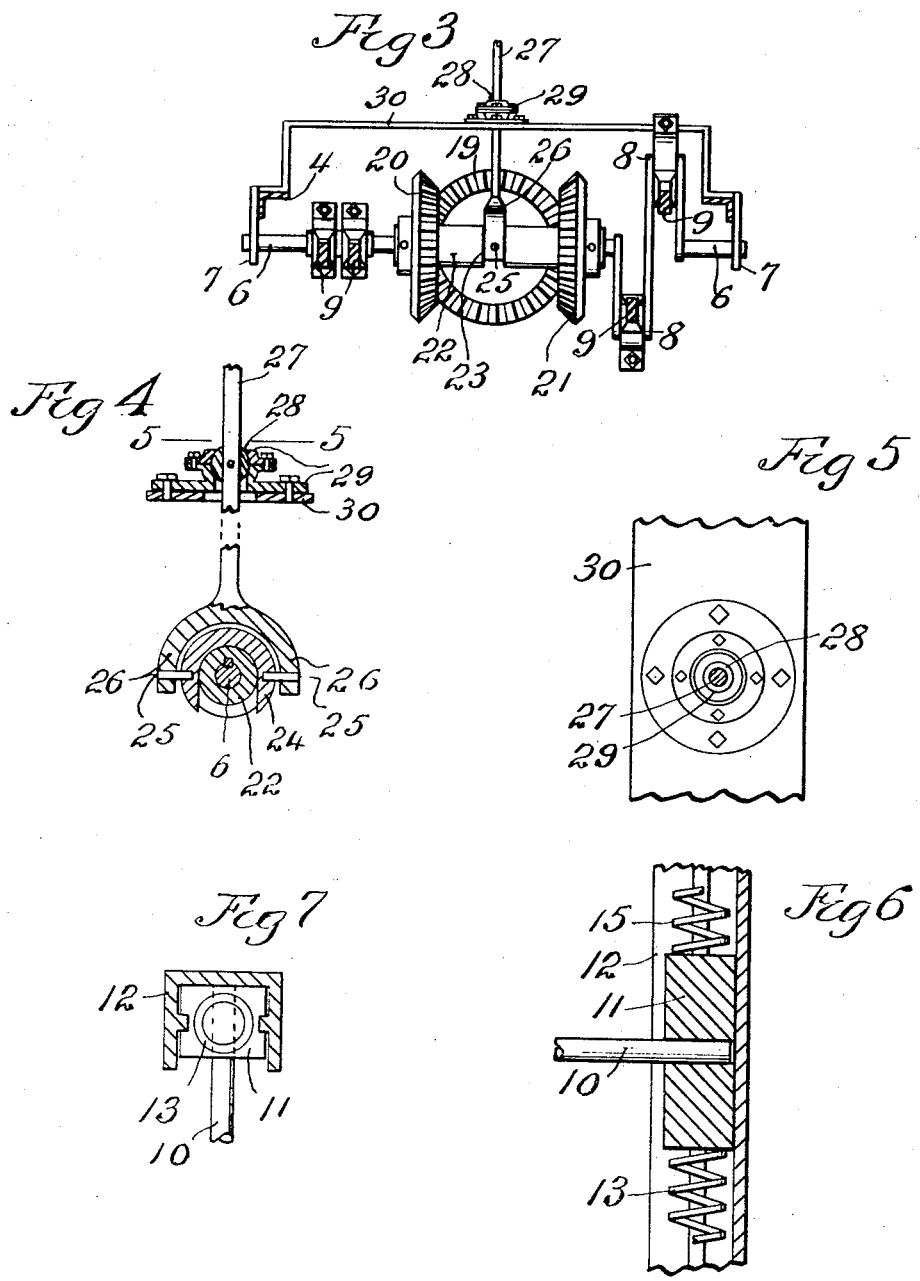

Patented Oct. 17, 1933

1,930,823

UNITED STATES PATENT OFFICE 1,930,823

VEHICLE PROPELLING MECHANISM

Ralph L. Newton, Kansas City, Mo.

Application July 29, 1932. Serial No. 625,638

4 Claims. (Cl. 180—70)

My invention relates to improvements in vehicle propelling mechanisms.

The object of my invention is to provide a novel vehicle propelling mechanism, which is simple, relatively cheap, strong, durable, not likely to get out of order, and which will be efficient in operation.

The novel features of my invention are hereinafter fully described and claimed.

In the accompanying drawings, which illustrate the preferred embodiment of my invention, Fig. 1 is a plan view, partly broken away, of my improved propelling mechanism.

Fig. 2 is a section on the line 2—2 of Fig. 1.

Fig. 3 is a section on the line 3—3 of Fig. 1.

Fig. 4 is a vertical sectional view of a portion of the gear shifting mechanism.

Fig. 5 is a section on the line 5—5 of Fig. 4.

Fig. 6 is an enlarged vertical sectional view of a portion of one of the fulcrum supports.

Fig. 7 is an enlarged cross section of one of the fulcrum supports, taken on the line 7—7 of Fig. 2, looking upwardly.

Similar characters of reference designate similar parts in the different views.

1 designates two vehicle carrying wheels supporting and having driving engagement with a horizontal driven shaft or axle 2 which is provided with four driven cranks 3 disposed respectively in different radial relationship, the cranks being spaced ninety degrees apart.

4 is a horizontal frame of the vehicle, which supports the body, not shown. Said frame 4 is supported at its rear end by springs 5 mounted on the axle or shaft 2.

A crank driving shaft 6 is revolubly supported by hangers 7 from the frame 4 at opposite sides thereof. Said driving shaft 6 is provided with four driving cranks 8 spaced ninety degrees apart so as to have the same radial relationship corresponding respectively to the cranks 3.

Four levers 9 are pivoted on a horizontal bar 10 constituting a fulcrum, and having its ends mounted in two bearings 11 vertically slidable respectively in two vertical channel guides 12, the upper ends of which are fastened to the frame 4.

In each channel guide 12 is a coil spring 13 the lower end of which bears on a plate 14 fastened to the lower end of the guide, the upper end of the spring bearing against the under side of the bearing 11. Another coil spring 15 has its lower end bearing on the top of the bearing 11, its upper end bearing against the frame 4.

Each lever 9 has at its opposite end portions two slots 16 and 17. The driving cranks 8 are respectively sildable and revoluble in the slots 16, and the driven cranks 3 are respectively revoluble and slidable in the slots 17, the driving and driven cranks connected with each lever occupying corresponding radial positions.

When the driving crank shaft 6 is revolved in either direction, the cranks 8 through the intermediacy of the levers 9 will effect rotation in the opposite direction of the driven crank shaft 2. Thus, when the driving shaft is revolved clockwise, as viewed in Fig. 2, the shaft or axle 2 will be revolved counter-clockwise, thus causing the carrying wheels 1 to move forwardly, assuming that such wheels are the rear wheels. Reversing the direction of rotation of the shaft 6 will effect reversal of revolution of the shaft 2 and wheels 1.

Any means may be provided for revolving the crank driving shaft 6 in both directions. For effecting the driving of said shaft, there is shown in the drawings the following described construction. 18 designates a horizontal longitudinal shaft which may be a part of the mechanism operated by the engine of the machine. Secured to and revoluble with the shaft 18 is a bevel gear wheel 19 which is adapted to mesh alternately with either of two bevel gear wheels 20 and 21 which are rigidly fastened to a sleeve 22 splined on the shaft 6 so as to revolve therewith and to slide thereon from the position shown in Fig. 1, in which the gear wheel 20 meshes with the gear wheel 19 to a position in which the gear wheel 21 will mesh with the gear wheel 19, and thus effect a reversal of direction of drive of the shaft 6.

To shift the sleeve 22 to said two positions, the sleeve is provided with an annular peripheral groove 23 in which is mounted a U-shaped member 24 having oppositely extending trunnions 25 pivoted in the two arms 26 respectively of a lever 27 having secured to it a spherical bearing member 28 oscillative in a bearing 29 supported on an inverted U-shaped yoke 30, the arms of which are attached to and supported by the frame 4 at opposite sides respectively thereof.

The fulcrum bar 10 is mounted in bearings 11 which have bearing against their upper and lower ends the coil springs 15 and 13, to compensate for the vertical movement of the frame 4 relatively to the driven shaft or axle 2.

The gear 19 and shaft 18 revolve clockwise, as viewed in Fig. 3, thus revolving the gear wheel 20 clockwise, as viewed in Fig. 2, when the latter gear meshes with the gear wheel 19. When the lever 27 is shifted so as to bring the gear wheel 21 into mesh with the gear wheel 19, the shaft 6 will be revolved counter-clockwise, thereby through the levers 9 reversing the direction of rotation of the shaft or axle 2.

Various modifications of my invention, within the scope of the appended claims, may be made without departing from the spirit of my invention.

What I claim is:—

1. In a vehicle propelling mechanism, a vehicle frame, a carrying wheel, a driven shaft having a crank and supported by said wheel and having driving engagement therewith, resilient means supporting said frame on said shaft, a driving crank, means supporting said driving crank on said frame, means on said frame for revolving said driving crank, a fulcrum, resilient means carried by said frame for supporting said fulcrum, and a lever mounted on said fulcrum and having sliding driving engagement with said cranks.

2. In a vehicle propelling mechanism, a vehicle frame, a driving shaft and a driven shaft, each having a crank and one of them being supported by said frame, resilient means supporting said frame on the other of said shafts, means for supporting said other shaft, a fulcrum, resilient means movable with said frame supporting said fulcrum, and a lever mounted on said fulcrum and having sliding driving engagement with said cranks.

3. In a vehicle propelling mechanism, a vehicle frame, a driving shaft and a driven shaft, each having a crank and one of them being supported by said frame, resilient means supporting said frame on the other of said shafts, means for supporting said other shaft, a fulcrum, resilient means movable with said frame supporting said fulcrum, resilient means for resisting the upward movement of said fulcrum, and a lever mounted on said fulcrum and having sliding driving engagement with said cranks.

4. In a vehicle propelling mechanism, a support, a driving shaft and a driven shaft, each having a crank and one of them supported by said support, resilient means supporting said support on the other of said shafts, said other shaft being vertically movable relatively to said support, a fulcrum, resilient means carried by said support and supporting and resisting vertical movement in both directions of said fulcrum, and a lever mounted on said fulcrum and having sliding driving engagement with said cranks.

RALPH L. NEWTON.